Patented July 24, 1923.

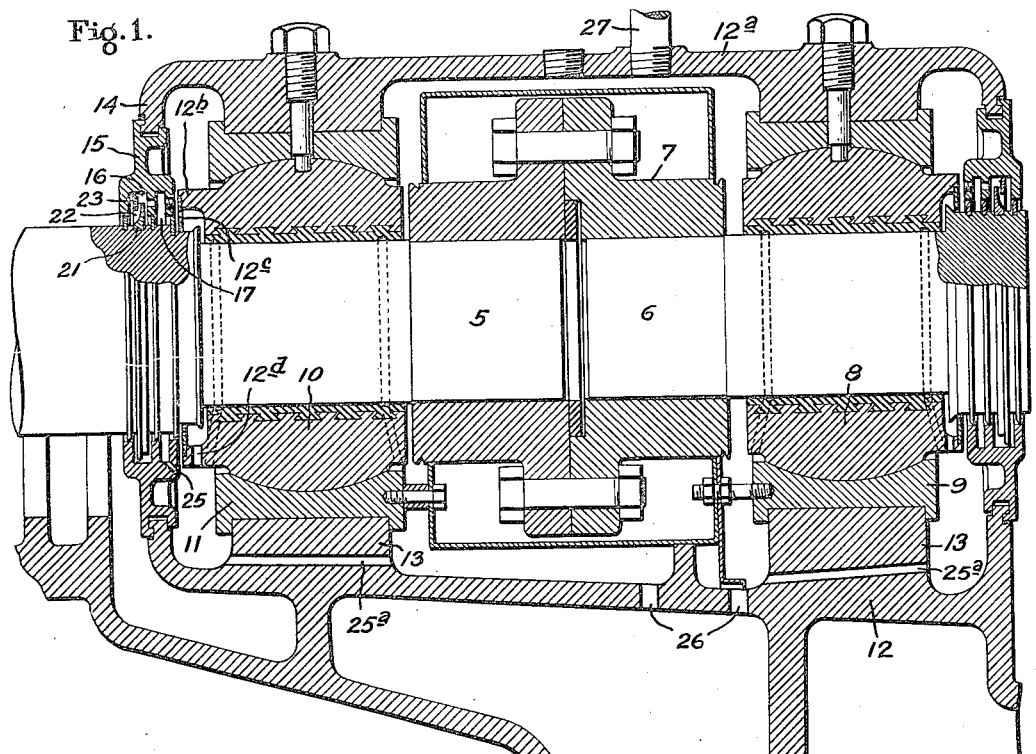
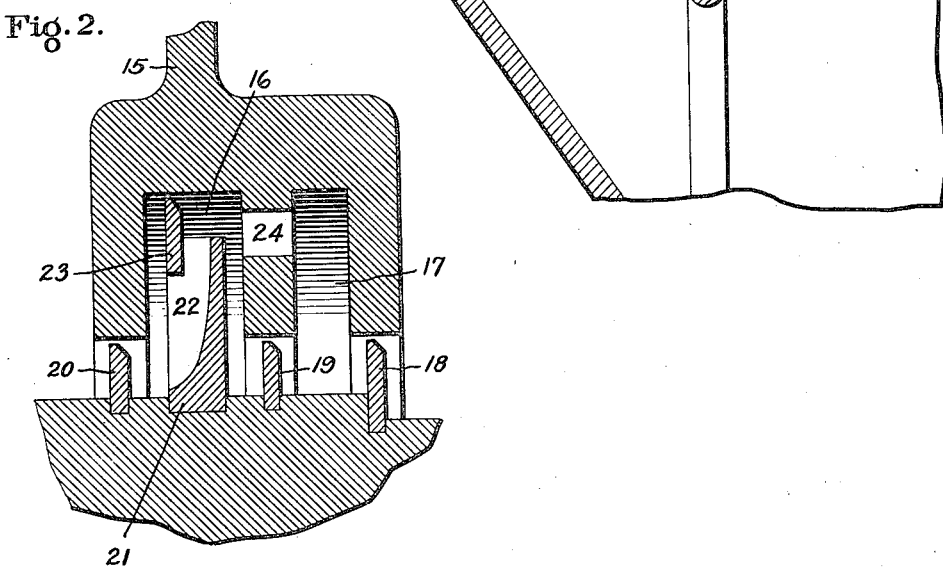
Inventor:
Oscar Junggren,
by (signature)
His Attorney

1,463,018

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

SHAFT BEARING.

Application filed January 15, 1921. Serial No. 437,565.

*To all whom it may concern:*

Be it known that I, OSCAR JUNGGREN, a citizen of the United States, residing at Schenectady, county of Schenectady, State of New York, have invented certain new and useful Improvements in Shaft Bearings, of which the following is a specification.

The present invention relates to shaft bearings such as are used to support the shafts of elastic fluid turbines and the like. In connection with the operation of such machines, trouble is often experienced with lubricating oil leaking from the outer ends of the bearings and being thrown by centrifugal force outwardly off the shaft, a thing usually termed "oil throwing." Such oil throwing from the end of a bearing is very objectionable in that it gets oil over surfaces and objects in the vicinity of the bearing, and the object of my present invention is to provide an improved structure and arrangement for preventing oil throwing.

For a consideration of what I believe to be novel and my invention, attention is directed to the accompanying description and the claims appended thereto.

In the drawing, Fig. 1 is an axial sectional view of a bearing structure provided with oil throwing preventing means embodying my invention, and Fig. 2 is a sectional detail on a larger scale.

Referring to the drawing, 5 and 6 indicate two adjacent shaft ends connected by a suitable coupling 7. Shaft end 6 is supported in a bearing comprising a pillow block 8 having an outer spherical surface which rests in a supporting ring 9. Shaft end 5 is supported in a pillow block 10 having an outer spherical surface which rests on a supporting ring 11. Supporting rings 9 and 11 are supported by a frame or pedestal 12 having projections 13 which form the immediate supports for rings 9 and 11. Frame 12 comprises side walls which cooperate with a cap or cover 12ª to form a bearing housing. At the end of the bearing is a flange 12ᵇ which carries an annular shield 12ᶜ thereby forming an annular oil chamber from which oil may drain away through an opening 12ᵈ. The foregoing arrangement may be taken as typical of any suitable bearing structure, the detail structure of the bearing not forming a part of the present invention.

In connection with each of the bearings, I have shown an oil throwing preventing structure embodying my invention both of which are of the same structure. I will accordingly specifically describe the arrangement shown at the left hand side of Fig. 1. It will be understood that this description applies also to that on the right hand side.

The frame or pedestal 12 and cap 12ª present an annular flange 14 which faces toward the shaft just beyond the end of the bearing and carried by this is a ring 15 which may be formed in two parts, the lower part being carried by the pedestal 12 and the upper part by the upper portion of the bearing housing, i. e. cap 12ª. In the inner surface of ring 15 are grooves forming two annular chambers, an outer impeller chamber 16 and an inner pressure chamber 17. These chambers surround the shaft and have an open side which is presented to the shaft. Between the shaft and the adjacent surfaces of the walls which define chambers 16 and 17 are packing rings 18, 19 and 20 which have close clearances with such surfaces. In chamber 16 is an impeller 21 having vanes 22 of suitable conformation on its outer side. Impeller 21 is adapted to suck air in at its central portion and deliver it around the periphery. Carried by the peripheral portions of impeller vanes 22 is a packing strip 23 the outer edge of which has a close clearance with the adjacent surface of chamber 16. The purpose of this packing strip is to divide the suction side from the discharge side of the impeller and prevent air from leaking from the discharge side back to the suction side. In the wall between chambers 16 and 17 are a suitable number of small openings 24 which serve to form a conduit means connecting the discharge side of impeller 21 to pressure chamber 17. In the inner wall of chamber 17 is a small opening 25 which serves as an oil discharge opening from chamber 17. In supports 13 are suitable passages 25ª for the escape of oil leaking from the ends of the bearings and at 26 are further suitable openings which permit the oil from passage 25ª to escape to a suitable drain pipe, not shown. At 27 is a breather pipe which connects with the atmosphere and which serves to permit the escape of oil vapors and gases which may form in the region surrounding coupling 7.

In operation, the impeller produces a suction on its inlet side which serves to draw air in between packing strip 20 and the adjacent wall against which it packs. This air is delivered at the periphery of the impeller, building up a pressure on the discharge side of the impeller and also in adjacent pressure chamber 17, the air escaping from the discharge side of the impeller to chamber 17 through the conduit formed by passages 24 and also through the annular space between packing ring 19 and the adjacent surfaces against which it packs. Air from pressure chamber 17 escapes through the annular space between packing ring 18 and the surfaces against which it packs. It will thus be seen that impeller 21 serves to draw air in along the shaft past packing ring 20 and deliver it along the shaft past packing rings 19 and 18. There is thus a continuous inward flow of air which serves to effectively prevent any outward flow of lubricant. Lubricant escaping from the end of the bearing is therefore confined in the space between the end of the bearing and ring 15 which forms an annular chamber, and from this chamber the lubricant escapes through passages 25$^a$ and 26.

The area and arrangement of the air passages is such that the impeller will handle a suitable volume of air and that a desired pressure will be built up on the discharge side of the impeller and in pressure chamber 17. Strip 23 makes a close running fit with the adjacent surface of chamber 16 and forms a simple and effective packing means for separating the discharge side of the impeller from the suction side and preventing the flow of air from the former to the latter.

In accordance with the provisions of the patent statutes I have described the principles of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. The combination with a shaft and a bearing therefor, of a bearing housing which projects beyond the end of the bearing and through the end of which the shaft projects, and means for preventing leakage from the end of the bearing along the shaft comprising a member carried by the bearing housing and providing two annular chambers having open sides facing the shaft, an impeller carried by the shaft and running in the outer chamber, and conduit means connecting the delivery side of the impeller chamber to the inner chamber, said impeller serving to take air from the outside and build up a pressure in the inner chamber to produce a flow of air along the shaft toward the bearing.

2. The combination with a shaft and a bearing therefor, of a member surrounding the shaft adjacent the end of the bearing and providing an annular chamber having an open side presented to the shaft, and an impeller carried by the shaft and running in the chamber, said impeller drawing air in along the shaft from the outside and delivering it along the shaft toward the bearing.

3. The combination with a shaft and a bearing therefor, of a member surrounding the shaft adjacent the end of the bearing and providing an annular chamber having an open side presented to the shaft, packing means between the shaft and the adjacent surfaces of the chamber walls, and an impeller carried by the shaft and running in the chamber, said impeller drawing air in along the shaft from the outside and delivering it along the shaft toward the bearing.

4. The combination with a shaft and a bearing therefor, of a ring which surrounds the shaft adjacent the end of the bearing and has annular grooves in its bore which forms annular chambers surrounding the shaft, packing means between the shaft and the adjacent surfaces of the walls which form said chambers, and an impeller in an outer chamber which draws air from the outside along the shaft and delivers it along the shaft to an inner chamber.

5. The combination with a shaft and a bearing therefor, of a member surrounding the shaft adjacent the end of the bearing and providing an annular chamber having an open side presented to the shaft, an impeller carried by the shaft and running in the chamber, said impeller drawing air in along the shaft from the outside and delivering it along the shaft toward the bearing, and a packing ring on the periphery of the impeller for preventing the flow of air from the delivery side of the impeller to its suction side.

In witness whereof, I have hereunto set my hand this 13th day of January, 1921.

OSCAR JUNGGREN.